(12) United States Patent  
Fredricks

(10) Patent No.: US 8,057,060 B2  
(45) Date of Patent: Nov. 15, 2011

(54) AQUARIUM LIGHT FIXTURE WITH LATCH MECHANISM AND BRACKET

(75) Inventor: Dennis Fredricks, Escondido, CA (US)

(73) Assignee: Cogent Designs, Inc., Escondido, CA (US)

( * ) Notice: Subject to any disclaimer, the term of this patent is extended or adjusted under 35 U.S.C. 154(b) by 390 days.

(21) Appl. No.: 12/425,333

(22) Filed: Apr. 16, 2009

(65) Prior Publication Data

US 2010/0265697 A1  Oct. 21, 2010

(51) Int. Cl.  
*F21V 33/00* (2006.01)
(52) U.S. Cl. ........................................... 362/101
(58) Field of Classification Search ............ 362/101  
See application file for complete search history.

(56) References Cited

U.S. PATENT DOCUMENTS

| | | | |
|---|---|---|---|
| 2,988,312 A | 6/1961 | Dumas | |
| 3,828,176 A | 8/1974 | Goldman et al. | |
| 3,834,351 A | 9/1974 | Schmidt | |
| 4,994,943 A | 2/1991 | Aspenwall | |
| 5,089,940 A | 2/1992 | Lanzarone et al. | |
| 5,165,778 A | 11/1992 | Matthias et al. | |
| 5,211,469 A | 5/1993 | Matthias et al. | |
| 5,848,837 A | 12/1998 | Gustafson | |
| 5,927,845 A | 7/1999 | Gustafson et al. | |
| 6,065,849 A | 5/2000 | Chen | |
| 6,166,496 A | 12/2000 | Lys et al. | |
| 6,184,628 B1 | 2/2001 | Ruthenberg | |
| 6,577,080 B2 | 6/2003 | Lys et al. | |
| 6,673,292 B1 | 1/2004 | Gustafson et al. | |
| 6,781,329 B2 | 8/2004 | Mueller et al. | |
| 6,921,182 B2 | 7/2005 | Anderson, Jr. et al. | |
| 6,967,448 B2 | 11/2005 | Morgan et al. | |
| 7,168,862 B2 | 1/2007 | Qi et al. | |
| 7,187,141 B2 | 3/2007 | Mueller et al. | |
| 7,220,018 B2 | 5/2007 | Crabb et al. | |
| 7,221,104 B2 | 5/2007 | Lys et al. | |
| 7,258,459 B2 | 8/2007 | Wang | |
| 7,427,840 B2 | 9/2008 | Morgan et al. | |
| 7,453,217 B2 | 11/2008 | Lys et al. | |
| 7,473,008 B2 | 1/2009 | Crabb et al. | |
| 7,482,764 B2 | 1/2009 | Morgan et al. | |

FOREIGN PATENT DOCUMENTS

| | | |
|---|---|---|
| DE | 4218880 | 7/1993 |
| GB | 2266043 | 10/1993 |

*Primary Examiner* — Jason Moon Han  
(74) *Attorney, Agent, or Firm* — Sheppard, Mullin, Richter & Hampton LLP; David E. Heisey

(57) ABSTRACT

Various embodiments of the present invention provide an aquarium light fixture comprising a light fixture and a bracket to support the light fixture, the bracket comprising a vertical portion configured to attach to an aquarium, a horizontal portion configured to support the light fixture above the aquarium, a hinge joint attaching the vertical portion to the horizontal portion, and a latch mechanism attached to the vertical portion and configured to secure the horizontal portion at a predetermined angle.

12 Claims, 9 Drawing Sheets

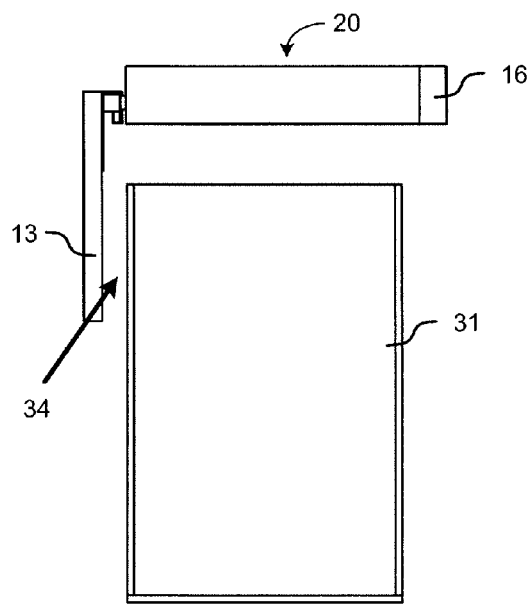
FIG. 4
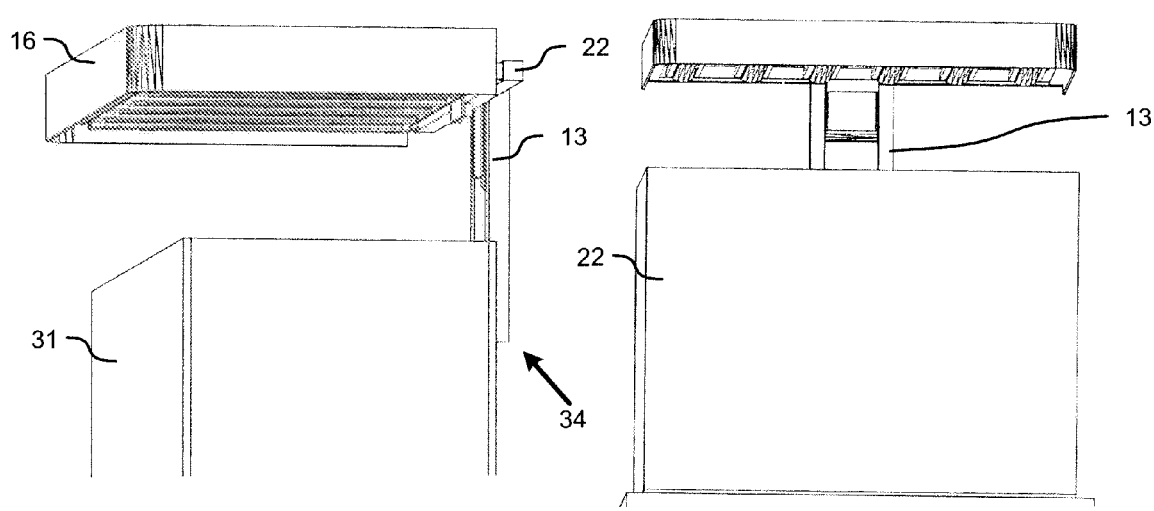
FIG. 5
FIG. 6

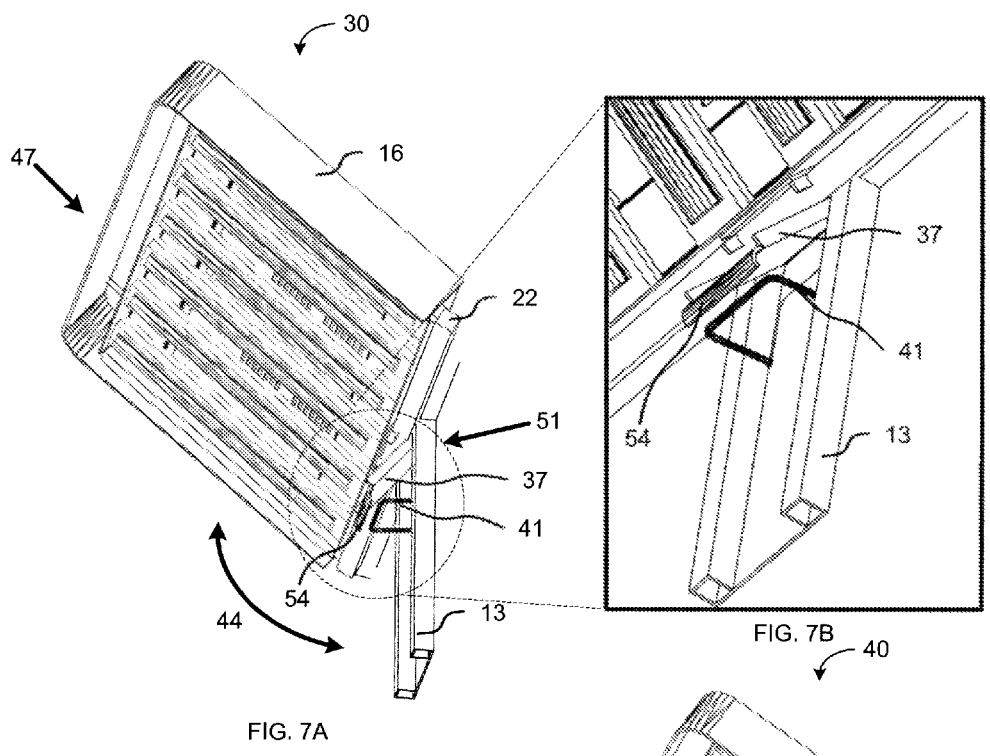
FIG. 7A
FIG. 7B
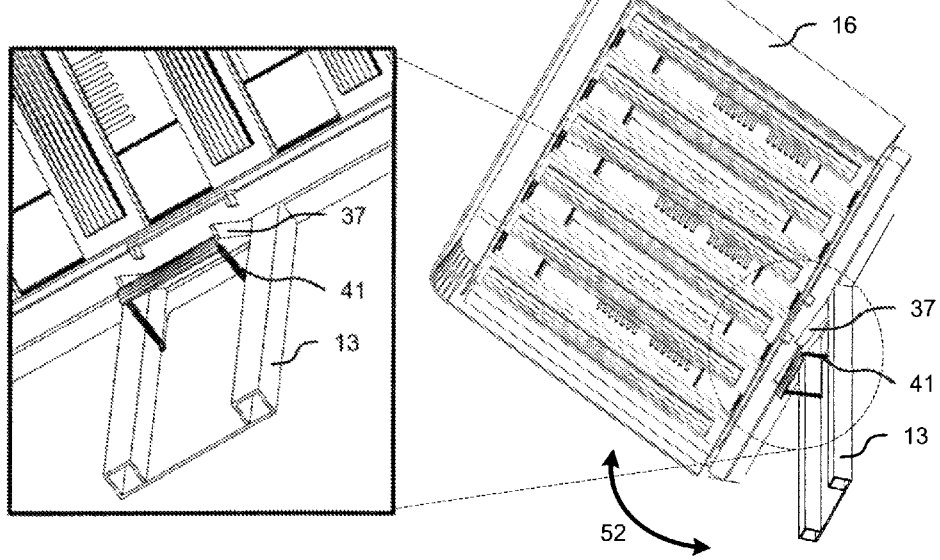
FIG. 8B
FIG. 8A

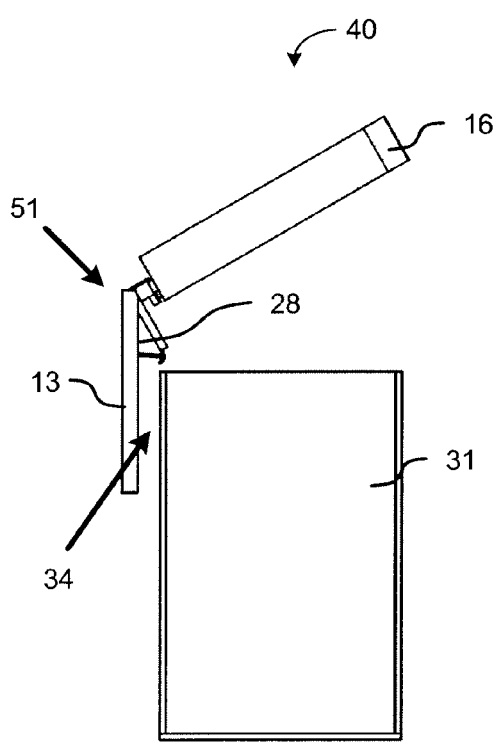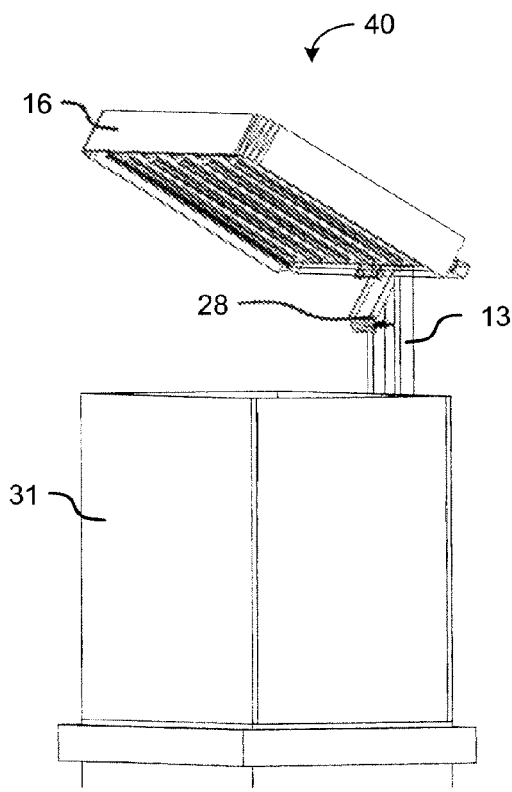
FIG. 9
FIG. 10

AQUARIUM LIGHT FIXTURE WITH LATCH MECHANISM AND BRACKET

FIELD OF THE INVENTION

The present invention relates to lighting apparatuses and, more particularly, some embodiments are directed toward lighting apparatuses used in conjunction with aquariums.

DESCRIPTION OF THE RELATED ART

Conventional aquarium light fixtures are generally composed of a shaded lamp affixed above opening of an aquarium. In order to attach the fixture to the aquarium, typical methods include placing the fixture over the aquarium whereby the entire aquarium opening is covered, and using rods/legs that extend out from the fixture and attach to the top of the sidewalls of the aquarium. These rods/legs elevate the light fixture above the aquarium opening and allow the rod/legs to clamp onto the aquarium. Yet other methods of attachment include custom ordered aquarium light fixtures that are made to order based on the specific size of the aquarium's opening.

However, these light fixtures with conventional attachment methods lead to reduced access to the aquarium opening. Light fixtures such as these usually require removal of some or all of the light fixture before the aquarium can be accessed for service or cleaning. In addition, light fixtures that use attachment methods involving rods/legs may result in damage to the aquarium, or encounter problems fitting the aquarium due to the incompatibility of the fixture with the aquarium.

BRIEF SUMMARY OF EMBODIMENTS OF THE INVENTION

Various embodiments of the present invention provide a lighting apparatus that may be utilized with aquariums. The features and functionality of some of these embodiments enable a person to easily access the top of an aquarium for various purposes, such as cleaning and maintenance. In addition, for some embodiments, the configurable features of the present invention allow it to be adjusted according to the size and shape of the particular aquarium being illuminated. After reading the description of the invention, it will be appreciated by those of ordinary skill in the art that various embodiments of the present invention can also be utilized in applications other than aquariums, such as in the field of horticulture.

In one embodiment, an aquarium lighting apparatus is provided comprising a light fixture and a bracket to support the light fixture. The bracket comprises a vertical portion configured to attach to an aquarium, a horizontal portion configured to support the light fixture above the aquarium, a hinge joint attaching the vertical portion to the horizontal portion, and a latch mechanism attached to the vertical portion. Within this embodiment, the horizontal portion is attached to the hinge joint by way of a support arm configured to allow the horizontal portion to slide away from the hinge joint; wherein the hinge joint allows the horizontal portion to be positioned at a first angle with respect to the vertical portion; wherein the hinge joint allows the horizontal portion to be lifted to a second angle with respect to the vertical portion, such that the second angle is greater than the first angle; and wherein the latch mechanism is configured to secure the horizontal portion at the second angle.

In another embodiment, the horizontal portion comprises a plurality of horizontal sub-portions configured to allow one or more horizontal sub-portions to slide away from the hinge joint; wherein the hinge joint allows the horizontal portion to be positioned at a first angle with respect to the vertical portion; wherein the hinge joint allows the horizontal portion to be lifted to a second angle with respect to the vertical portion, such that the second angle is greater than the first angle; and wherein the latch mechanism is configured to secure the horizontal portion at the second angle.

In some embodiments, the latch mechanism comprises a strut configured to latch into a deployed position when securing the horizontal portion at the second angle, and configured to unlatch into a retracted position when the horizontal portion is positioned at the first angle. The latch mechanism may include a resilient element that assists in biasing the strut into the deployed position, the retracted position, or both.

Within various embodiments of the invention, the hinge joint is configured with a resilient element that assists in lifting the horizontal portion from the first angle to the second angle.

In some embodiments of the invention, the vertical portion attaches to an aquarium using adhesive, clamps, suction mechanisms, fasteners or screws. In addition, the vertical portion in further embodiments is adjustable with respect to the aquarium. For some such embodiments, the adjustment is vertical in nature. In additional embodiments, the vertical portion comprises a plurality of sub-portions allowing the horizontal portion and some of the vertical sub-portions to be removed from the aquarium while allowing at least one sub-portion to remain attached to the aquarium.

In further embodiments, the horizontal portion maybe curvilinear in shape and further comprising a plurality of horizontal sub-portions connected together using one or more hinge joints.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 4 is a side view of an example lighting apparatus in accordance with one embodiment of the invention, used in conjunction with an example aquarium.

FIG. 5 is a perspective view of the side of an example lighting apparatus in accordance with one embodiment of the invention, used in conjunction with an example aquarium.

FIG. 6 is a perspective view of an example lighting apparatus in accordance with one embodiment of the invention, used in conjunction with an example aquarium.

FIG. 7A is a perspective view of an example lighting apparatus in accordance with one embodiment of the invention, tilted upward.

FIG. 7B is a blow-up view of a latching mechanism in accordance with one embodiment of the invention, as the example lighting apparatus is tilted upward.

FIG. 8A is a perspective view of an example lighting apparatus in accordance with one embodiment of the invention, set in a tilted configuration after the latch is engaged.

FIG. 8B is a blow-up view of a latching mechanism in accordance with one embodiment of the invention, after the latch is engaged.

FIG. 9 is a side view of an example lighting apparatus in accordance with one embodiment of the invention, tilted upward after the latch is engaged and used in conjunction with an example aquarium.

FIG. 10 is a perspective view of an example lighting apparatus in accordance with one embodiment of the invention, tilted upward after the latch is engaged and used in conjunction with an example aquarium.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward lighting apparatuses having an adjustable bracket that allows for height adjustment and light fixture positioning; and a latching mechanism that allows for maintaining a light fixture in a tilted orientation. For some embodiments, the adjustable bracket allows for easy access to an aquarium and provides the ability to adjust the light fixture such that it can properly illuminate the aquarium. In further embodiments, the latching mechanism is configured to provide easy access to an aquarium for various purposes, such as cleaning the aquarium or performing maintenance on the aquarium.

The following description is presented to enable any person skilled in the art to make and use the invention. For purposes of explanation, specific nomenclature is set forth to provide a thorough understanding of the present invention. Descriptions of specific applications and apparatus of the present invention are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
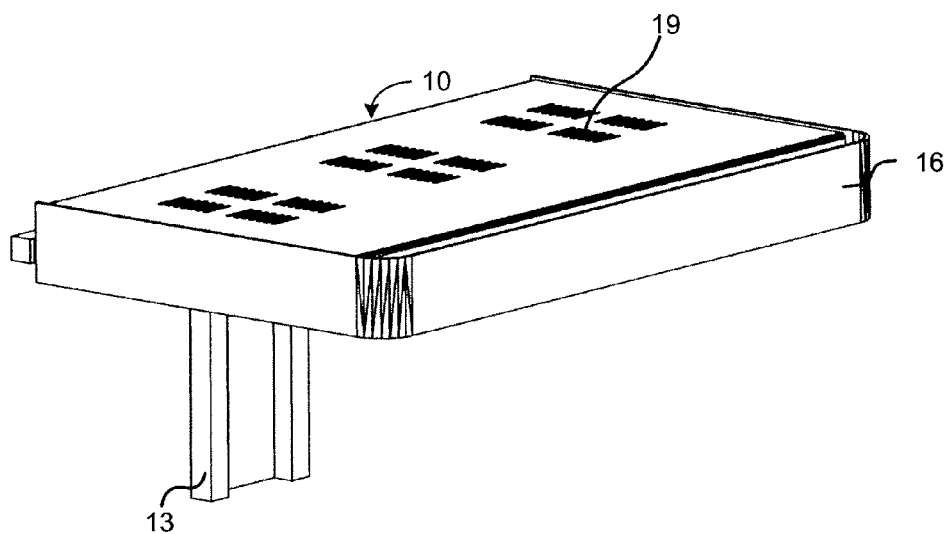
FIG. 1 is a perspective view of an example lighting apparatus in accordance with one embodiment of the invention.
Figure 2:
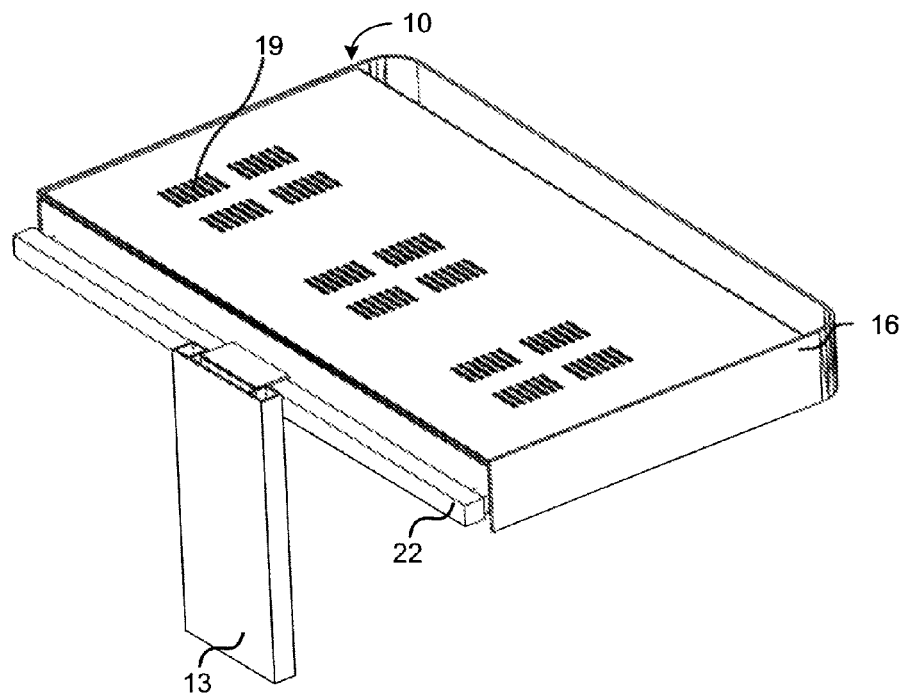
FIG. 2 is a perspective view of an example lighting apparatus in accordance with one embodiment of the invention.

FIG. 1 is a perspective view of the front of an example lighting apparatus 10 in accordance with one embodiment of the invention. The lighting apparatus 10 as depicted comprises a horizontal portion 16 and a vertical portion 13. As illustrated, the horizontal portion, which houses the light fixture, may be equipped with heat dissipation features, such as vents 19, that allow heat generated by the light fixture to properly dissipate. Viewed from another angle, FIG. 2 depicts a horizontal support bar 22, which is a part of the horizontal portion 16 and provides support to horizontal portion 16 by way of one or more support arms. The support arms of horizontal portion 16 will be described later in greater detail with respect to FIGS. 13-14.

Figure 3:
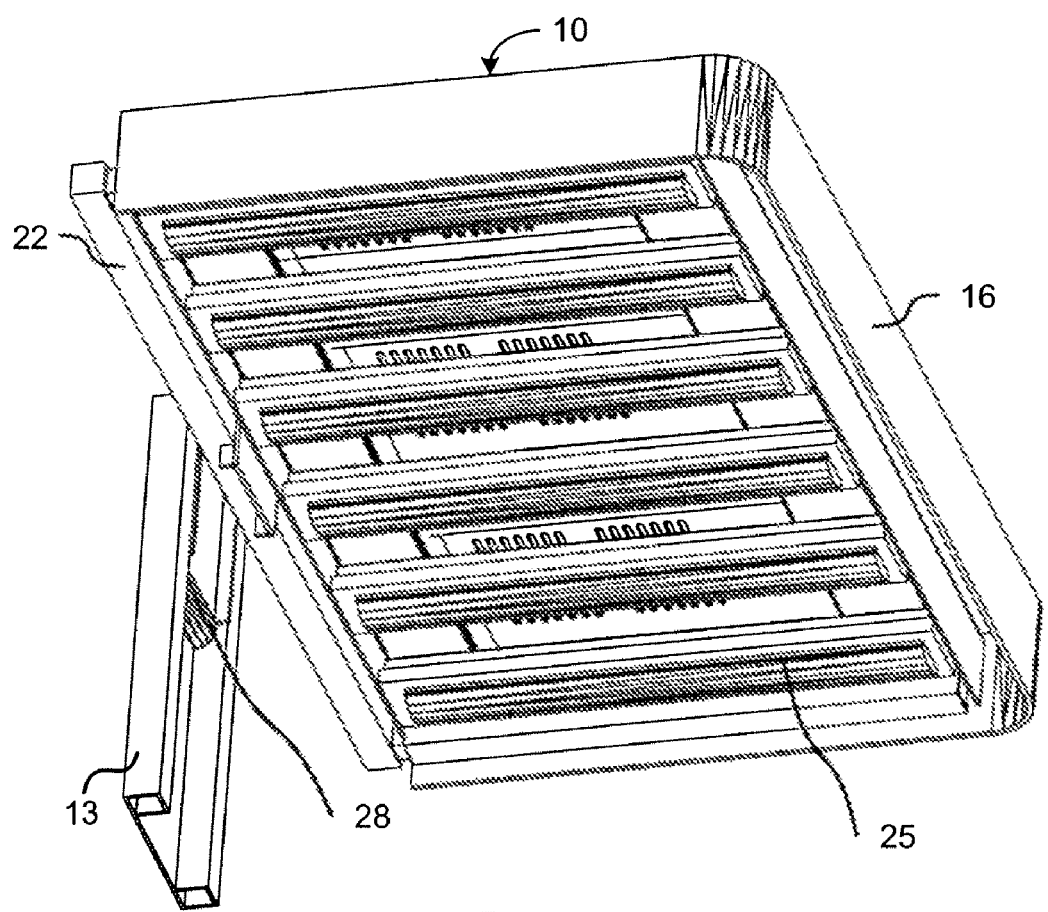
FIG. 3 is a perspective view of an example lighting apparatus in accordance with one embodiment of the invention.

Turning now to FIG. 3, which provides a perspective view of the bottom of lighting apparatus 10, horizontal portion 16 houses light fixture 25. The light fixture 25 can be implemented by a variety of lighting technologies, including light emitting diodes (LEDs), xenon bulbs, halogen bulbs, and the like. Optionally, the power supply for light fixture 25 can also be housed internally within horizontal portion 16 or, in the alternative, externally from lighting apparatus 10. Also illustrated is the latch mechanism 28, which will be described in greater detail with respect to FIGS. 7-10.

FIG. 4 provides a side view of an example configuration 20 using lighting apparatus 10 in accordance with one embodiment of the invention. As depicted in this figure, lighting apparatus 10 is attached to aquarium 31 at location 34. However, alternative forms of attachment may also be used in mounting lighting apparatus 10 to aquarium 31, including adhesives, screws, suction mechanisms, clamps, and fasteners. FIGS. 5 and 6 provide additional views of lighting apparatus 10 set in configuration 20.

FIGS. 7-8 provide several perspectives of lighting apparatus 10 in two different configurations (30 and 40) where the latch mechanism 28 is used in accordance with one embodiment of the invention. FIGS. 7A and 7B depict the first configuration (30). As illustrated, vertical portion 13 is attached to the aquarium such that when horizontal portion 16 is lifted upward from one end (47), it pivots around a hinge joint at location 51. In doing so, angle of incidence 44 between horizontal portion 16 and vertical portion 13 is increased, allowing the extraction of strut 41 from vertical portion 13. It should be noted, horizontal portion 16 as depicted in FIGS. 7A and 7B is equipped with a vertical leg 37 that is attached to horizontal portion 16 and is substantially perpendicular with respect to horizontal portion 16. As will be seen below, this vertical leg 37 allows latching mechanism 28 to secure the horizontal portion 16 in a tilted orientation.

As horizontal portion 16 is lifted from one end 47 and its angle of incidence 44 with respect to vertical portion 13 is thereby increased, so increases the angle of incidence between vertical leg 37 and vertical portion 13. Once a sufficient angle of incidence is achieved between vertical leg 37 and vertical portion 13, and there is sufficient clearance between vertical leg 37 and vertical portion 13, strut 41 is able to be extracted from vertical portion 13. Once extracted, strut 41 may be positioned such that it rests against vertical leg 37 and thereby maintains a predetermined angle of incidence between vertical leg 37 and vertical portion 13. Some embodiments may utilize a lip 54 at the end of vertical leg 37 such that vertical leg 37 is allowed to rest against strut 41, as illustrated in configuration 40 of FIGS. 8A and 8B.

Alternatively, a cavity, crevice, or notch on vertical leg 37 may be used in place of lip 54 for securing strut 41. Different embodiments may also replace strut 41 with an adjustable strut optionally allowing individuals to set a desired angle of incidence 52 between the horizontal portion 16 and vertical portion 13.

FIG. 9 illustrates use of lighting apparatus 10 with aquarium 31. Lighting apparatus 10 is set in configuration 40. FIG. 10 provides a perspective view of the same. When lighting apparatus 10 is secured in a tilted orientation as shown, an individual is provided with sufficient clearance for easy accessibility to the top opening of the aquarium.

Embodiments such as lighting apparatus 10 may include a resilient element, such as a spring, that assist an individual in the lifting of the horizontal portion 16 to the tilted position. This is particularly useful when the horizontal portion 16 is rather large, heavy, or bulky. Similarly, strut 41 can also further include a resilient element to provide ease in its deployment, its retraction, or both. In particular embodiments, when strut 41 is deployed, it may be latched into position to ensure that the strut 41 does not inadvertently retract when vertical leg 37 is resting upon it.

Figures 11A, 11B:
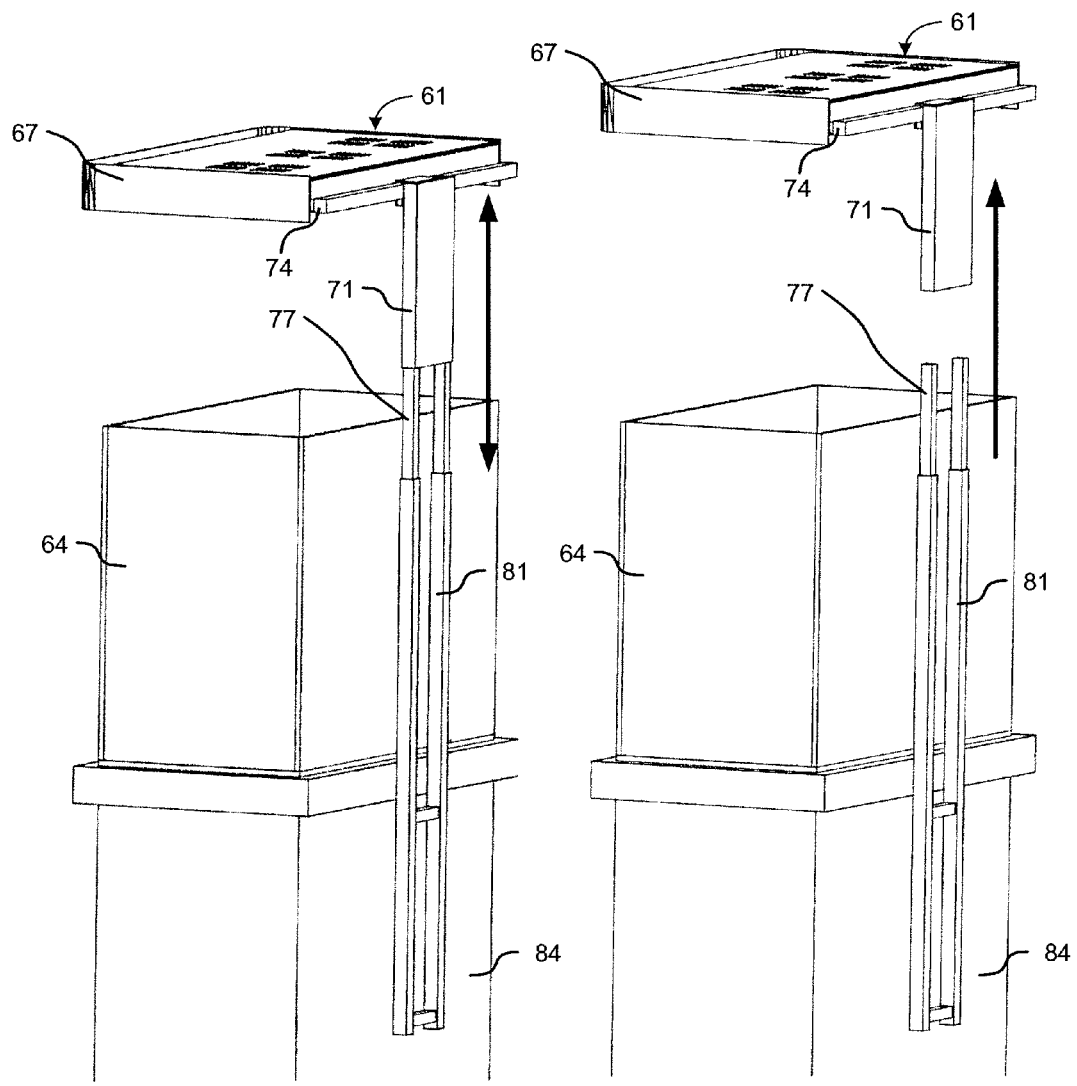
FIGS. 11A and 11B are perspective views of an example lighting apparatus in accordance with one embodiment of the invention, used in conjunction with an example aquarium.
Figure 12:
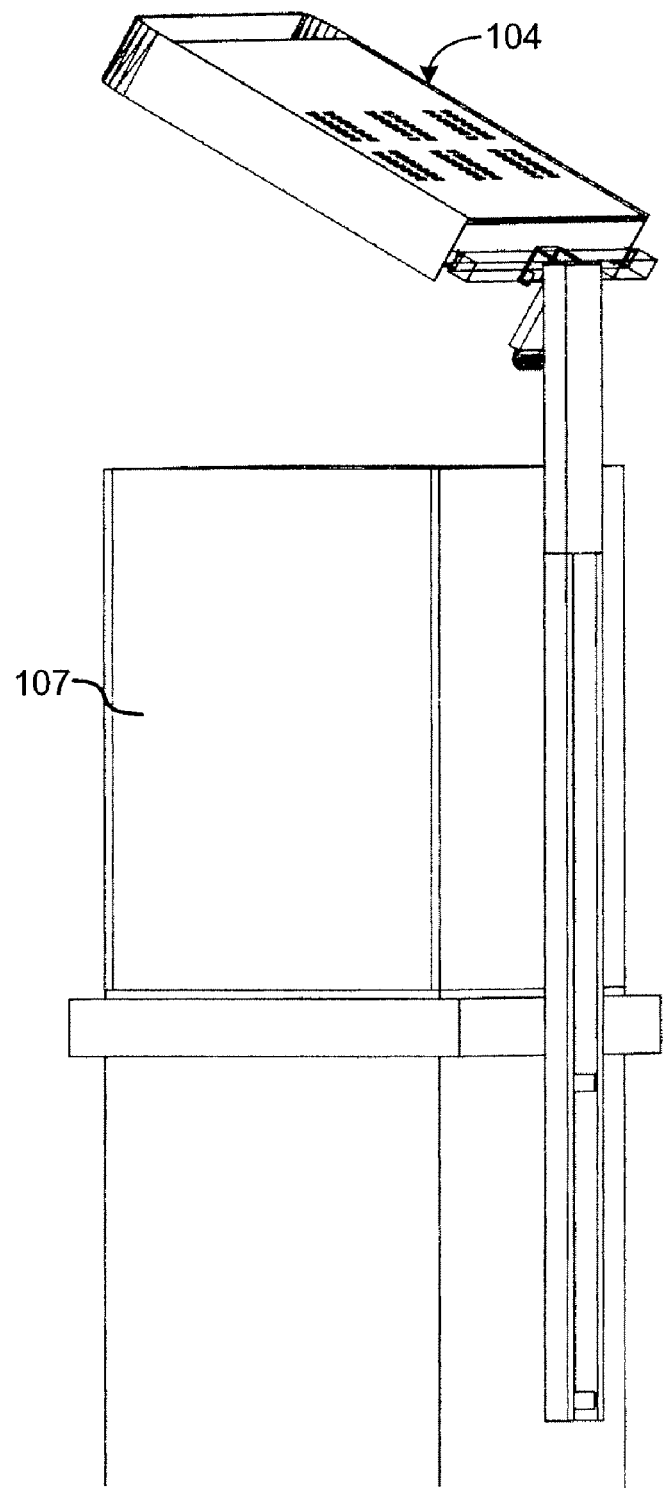
FIG. 12 is a perspective view of the rear of an example lighting apparatus in accordance with one embodiment of the invention, used in conjunction with an example aquarium.

Referring now to FIG. 11A, a perspective view of the rear of lighting apparatus 61 with a height adjustable feature is depicted, as used in conjunction with aquarium 64. The lighting apparatus 61 comprises a horizontal portion 67 comprising a support bar 74, and a vertical portion comprising an upper vertical portion 71, a lower vertical portion 81, and vertical extender arms 77. As depicted in figure, the height adjustability is facilitated by the vertical extender arms 77, which allow the horizontal portion 67 and the upper vertical portion 71 to telescope upward or downward in height with respect to the aquarium 64. In some embodiments, the height adjustment may be further facilitated with a key disposed on either the upper vertical portion 71 or the lower vertical portion 81, or both, allowing the respective portions to engage the extender arms 77 once a desired height is met, thereby securing the arms in place. With regards to attachment of the lighting apparatus 61 to the aquarium 64, the vertical portion may be secured to aquarium 64 by directly attaching it to the aquarium 64, or by securing it to the aquarium's base stand 84.

Additionally, both the horizontal portion 67 and the upper vertical portion 71 may be removed from the extender arms 77 as one unit, as illustrated in FIG. 11B. This may be useful for a variety of purposes, including maintenance or service of the aquarium 64, the lighting fixture 61, or both.

Figure 13:
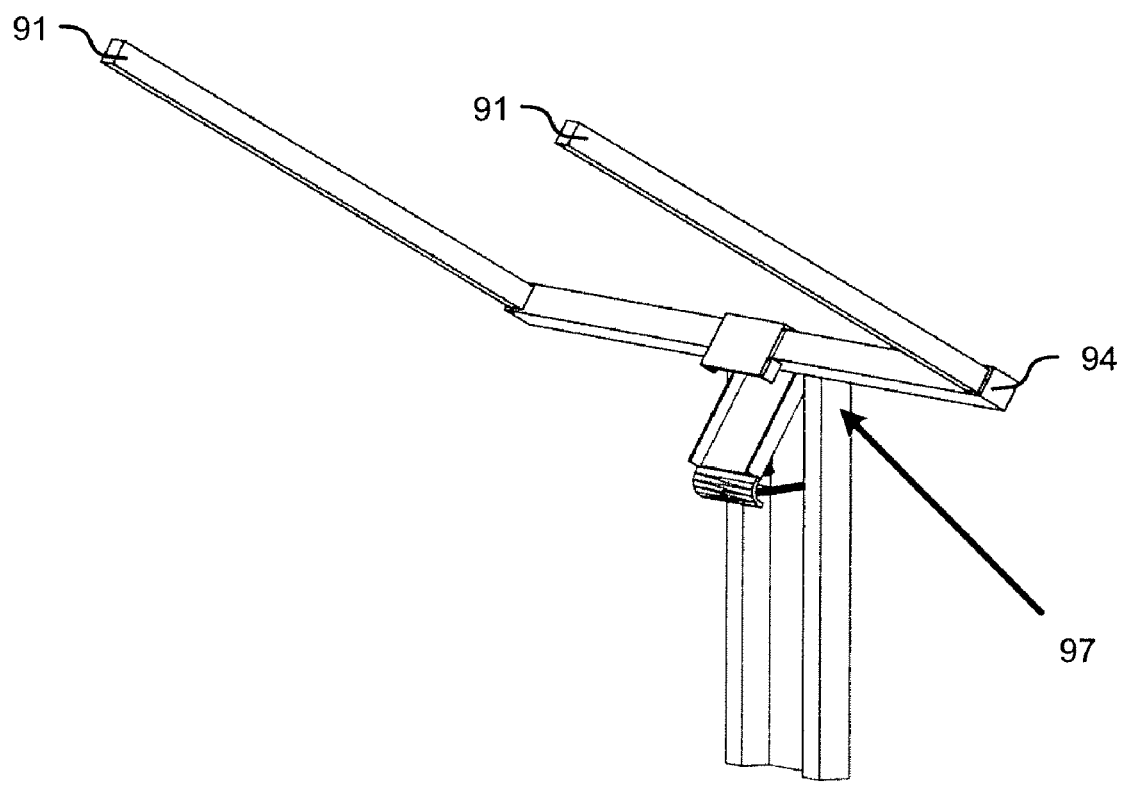
FIG. 13 is a side view of example support arms used in lighting apparatuses in accordance with one embodiment of the invention.
Figures 14A, 14B:
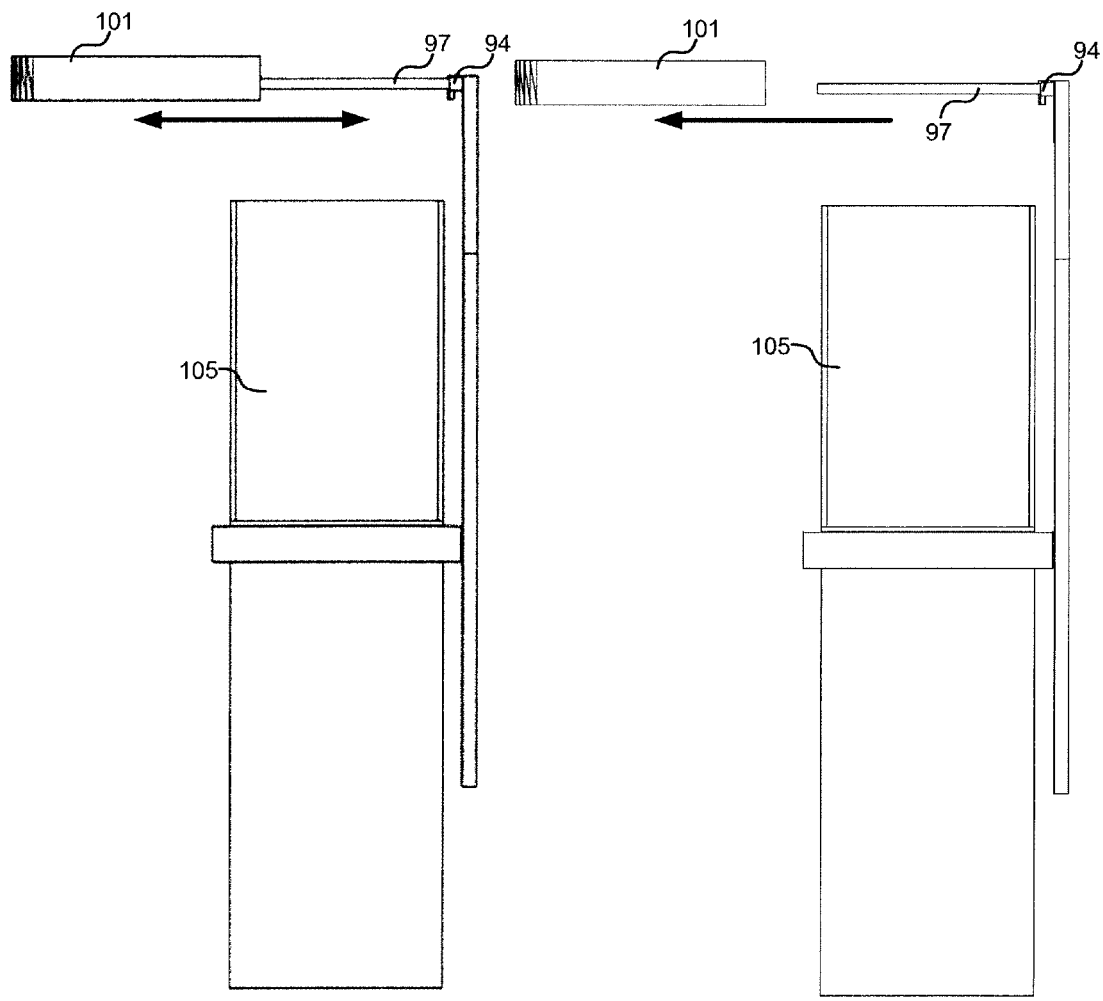
FIGS. 14A and 14B are side views of an example lighting apparatus in accordance with one embodiment of the invention, used in conjunction with an example aquarium.

Turning now to FIG. 13, an example set of support arms 91 is depicted. The set of support arms 91 are attached to the hinge joint 97 of the lighting apparatus by way of support bar 94. Both the set of support arms 91 and the support bar 94 are components of the horizontal portion of the lighting apparatus, as described earlier. As illustrated in FIGS. 14A & 14B, the set of support arms 91 in conjunction with support bar 94 allow a housing section 101 of a horizontal portion (which houses the light fixture) to telescope toward the support bar 94 or away from the support bar 94, as it slides along the support arms 91. Additionally, a key may be disposed on housing section 101 so as to secure it to support arms 91 once a desired position over the aquarium 105 is found for the housed light fixture.

While various embodiments of the present invention have been described above, it should be understood that they have been presented by way of example only, and not of limitation.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An aquarium lighting apparatus, comprising:
   a light fixture; and
   a bracket comprising:
      a vertical portion configured to attach to an aquarium,
      a horizontal portion configured to support the light fixture above the aquarium,
      a hinge joint attaching the vertical portion to the horizontal portion; and
      a latch mechanism attached to the vertical portion;
   wherein the horizontal portion is attached to the hinge joint by way of a support arm configured to allow the horizontal portion to slide away from the hinge joint;
   wherein the hinge joint allows the horizontal portion to be positioned at a first angle with respect to vertical portion;
   wherein the hinge joint allows the horizontal portion to be lifted to a second angle with respect to the vertical portion, such that the second angle is greater than the first angle; and
   wherein the latch mechanism comprises a strut configured to latch in a deployed position when securing the horizontal portion at the second angle, and configured to unlatch into a retracted position when the horizontal portion is positioned at the first angle.

2. The aquarium lighting apparatus of claim 1, wherein the latch mechanism includes a resilient element that assists in positioning the strut in the deployed position.

3. The aquarium lighting apparatus of claim 1, wherein the latch mechanism includes a resilient element that assists in positioning the strut in the retracted position.

4. The aquarium lighting apparatus of claim 1, wherein the horizontal portion includes a vertical leg that is utilized in conjunction with the latching mechanism to secure the horizontal portion at the second angle.

5. The aquarium lighting apparatus of claim 1, wherein the hinge joint includes a resilient element that assists in lifting the horizontal portion from the first angle to the second angle.

6. The aquarium lighting apparatus of claim 1, wherein the vertical portion is attached to the aquarium using adhesive, clamps, suction mechanisms, fasteners or screws.

7. The aquarium lighting apparatus of claim 1, wherein the vertical portion is adjustable with respect to the aquarium.

8. The aquarium lighting apparatus of claim 6, wherein the vertical portion is vertically adjustable.

9. The aquarium lighting apparatus of claim 1, wherein the vertical portion comprises a plurality of sub-portions allowing the horizontal portion and some of the vertical sub-portions to be removed from the aquarium while allowing at least one sub-portion to remain attached to the aquarium.

10. The aquarium lighting apparatus of claim 1, wherein the horizontal portion is curvilinear in shape.

11. The aquarium lighting apparatus of claim 1, wherein the horizontal portion further comprises a plurality of horizontal sub-portions connected together using one or more hinge joints.

12. An aquarium lighting apparatus, comprising:
   a light fixture; and
   a bracket comprising:
      a vertical portion configured to attach to an aquarium,
      a horizontal portion configured to support the light fixture above the aquarium,
      a hinge joint attaching the vertical portion to the horizontal portion; and
      a latch mechanism attached to the vertical portion;
   wherein the horizontal portion comprises a plurality of horizontal sub-portions configured to allow one or more horizontal sub-portions to slide away from the hinge joint;
   wherein the hinge joint allows the horizontal portion to be positioned at a first angle with respect to vertical portion;
   wherein the hinge joint allows the horizontal portion to be lifted to a second angle with respect to the vertical portion, such that the second angle is greater than the first angle; and
   wherein the latch mechanism comprises a strut configured to latch in a deployed position when securing the horizontal portion at the second angle, and configured to unlatch into a retracted position when the horizontal portion is positioned at the first angle.

* * * * *